US010604667B2

(12) United States Patent
Pilon et al.

(10) Patent No.: US 10,604,667 B2
(45) Date of Patent: Mar. 31, 2020

(54) INK COMPOSITION INCLUDING POLYURETHANE

(71) Applicant: CRYOVAC, LLC, Charlotte, NC (US)

(72) Inventors: Lawrence A. Pilon, Grand Island, NY (US); Sopheap Ros, Grand Island, NY (US); Tom N. Huang, East Amherst, NY (US); Edgardo Lopez, Grand Island, NY (US); Kevin J. Hook, Grand Island, NY (US)

(73) Assignee: Cryovac, LLC, Charlotte, NC (US)

( * ) Notice: Subject to any disclaimer, the term of this patent is extended or adjusted under 35 U.S.C. 154(b) by 44 days.

(21) Appl. No.: 15/321,954

(22) PCT Filed: Jun. 25, 2015

(86) PCT No.: PCT/US2015/037750
§ 371 (c)(1),
(2) Date: Dec. 23, 2016

(87) PCT Pub. No.: WO2015/200670
PCT Pub. Date: Dec. 30, 2015

(65) Prior Publication Data
US 2017/0130080 A1 May 11, 2017

Related U.S. Application Data

(60) Provisional application No. 62/017,804, filed on Jun. 26, 2014.

(51) Int. Cl.
*B41J 2/01* (2006.01)
*C09D 11/102* (2014.01)
*C09D 11/30* (2014.01)

(52) U.S. Cl.
CPC ............. *C09D 11/102* (2013.01); *B41J 2/01* (2013.01); *C09D 11/30* (2013.01)

(58) Field of Classification Search
None
See application file for complete search history.

(56) References Cited

U.S. PATENT DOCUMENTS

| | | | |
|---|---|---|---|
| 3,450,791 A | 6/1969 | Sekmakas et al. | |
| 5,091,444 A | 2/1992 | Bauer et al. | |
| 5,352,283 A | 10/1994 | Beach et al. | |
| 5,556,925 A | 9/1996 | Kousaka et al. | |
| 5,652,286 A | 7/1997 | Deng | |
| 5,744,519 A | 4/1998 | Heraud et al. | |
| 5,760,123 A | 6/1998 | Vogt-Birnbrich et al. | |
| 5,825,391 A | 10/1998 | Yang | |
| 5,874,488 A | 2/1999 | Wang et al. | |
| 5,958,169 A | 9/1999 | Titterington et al. | |
| 6,028,126 A | 2/2000 | Wang et al. | |
| 6,060,541 A | 5/2000 | Anderson et al. | |
| 6,069,218 A | 5/2000 | Vogt-Birnbrich et al. | |
| 6,103,780 A | 8/2000 | Matzinger et al. | |
| 6,136,890 A | 10/2000 | Carlson et al. | |
| 6,179,417 B1 | 1/2001 | Lowry et al. | |
| 6,312,858 B1 | 11/2001 | Yacobucci et al. | |
| 6,437,041 B1 | 8/2002 | Bosch et al. | |
| 6,531,228 B1 | 3/2003 | Bartelink et al. | |
| 6,670,002 B1 | 12/2003 | Sekiguchi et al. | |
| 6,682,779 B1 | 1/2004 | Wefringhaus et al. | |
| 6,780,231 B2 | 8/2004 | Scholz et al. | |
| 6,794,425 B1 | 9/2004 | Ellis et al. | |
| H2113 H | 1/2005 | Nichols et al. | |
| 6,852,763 B2 | 2/2005 | Noda | |
| 6,863,389 B2 | 3/2005 | Merz et al. | |
| 6,905,732 B1 | 6/2005 | Dunshee et al. | |
| 7,022,385 B1 | 4/2006 | Nasser | |
| 7,132,014 B2 | 11/2006 | Mizutani et al. | |
| 7,176,248 B2 | 2/2007 | Valentini et al. | |
| 7,374,605 B2 | 5/2008 | Chung et al. | |
| 7,513,945 B2 | 4/2009 | Nakano et al. | |
| 7,637,605 B2 | 12/2009 | Mukata et al. | |
| 7,649,030 B2 | 1/2010 | Iu | |
| 7,740,694 B2 | 6/2010 | Sharmin et al. | |
| 7,785,410 B2 | 8/2010 | Renner et al. | |
| 7,828,426 B2 | 11/2010 | Brust et al. | |
| 7,871,467 B2 | 1/2011 | Sano et al. | |
| 7,872,060 B2 | 1/2011 | Schmid et al. | |
| 7,942,960 B2 | 5/2011 | Sano et al. | |
| 7,988,777 B2 | 8/2011 | Tanoue et al. | |
| 8,025,918 B2 | 9/2011 | Broguiere et al. | |
| 8,092,003 B2 | 1/2012 | Sloan | |
| 8,142,559 B2 | 3/2012 | Robertson et al. | |
| 8,187,371 B2 | 5/2012 | Brust et al. | |
| 8,192,008 B2 | 6/2012 | Brust et al. | |
| 8,267,505 B2 | 9/2012 | Jolly et al. | |
| 8,313,572 B2 | 11/2012 | Oyanagi et al. | |
| 8,430,492 B2 | 4/2013 | Falkner et al. | |
| 8,465,580 B2 | 6/2013 | Tanoue et al. | |
| 8,476,332 B2 | 7/2013 | Jeremic | |
| 8,480,223 B2 | 7/2013 | Shibata | |
| 8,492,456 B2 | 7/2013 | Chen et al. | |
| 8,563,634 B2 | 10/2013 | Deiner et al. | |
| 8,573,762 B1 | 11/2013 | Prasad | |
| 8,574,356 B2 | 11/2013 | Kagata et al. | |

(Continued)

FOREIGN PATENT DOCUMENTS

| | | |
|---|---|---|
| EP | 1180540 | 2/2002 |
| EP | 1293545 | 3/2003 |

(Continued)

OTHER PUBLICATIONS

International Searching Authority, International Preliminary Report on Patentability, dated Jan. 5, 2017, for International Application No. PCT/US2015/037750, Applicant, R.R. Donnelley & Sons Company (6 pages).

(Continued)

*Primary Examiner* — Erica S Lin
(74) *Attorney, Agent, or Firm* — McCracken & Gillen LLC

(57) ABSTRACT

According to one aspect, an ink composition includes a colorant, a polyurethane having a peak average molecular weight range of from about 25,000 g/mol to about 35,000 g/mol, and a solvent. The ink composition has a total solids content of less than about 12% by weight, and a ratio of colorant to polyurethane between about 1:1 and 1:2 by weight.

16 Claims, No Drawings

(56) References Cited

U.S. PATENT DOCUMENTS

| | | | |
|---|---|---|---|
| 8,623,126 B1 | 1/2014 | Brust et al. | |
| 8,664,331 B2 | 3/2014 | Richards | |
| 8,716,390 B2 | 5/2014 | Reisacher et al. | |
| 8,759,418 B2 | 6/2014 | Li et al. | |
| 8,841,357 B2 | 9/2014 | Nagahama et al. | |
| 8,939,568 B2 | 1/2015 | Stoeva et al. | |
| 8,940,821 B2 | 1/2015 | Brust et al. | |
| 9,085,150 B2 | 7/2015 | Aoyama | |
| 9,090,734 B2 | 7/2015 | Kraiter et al. | |
| 9,187,665 B2 | 11/2015 | Vasudevan et al. | |
| 9,228,096 B2 | 1/2016 | Overbeerk et al. | |
| 9,249,326 B2 | 2/2016 | Robertson et al. | |
| 9,376,582 B1 | 6/2016 | Dannhauser et al. | |
| 9,493,013 B2 | 11/2016 | Chen et al. | |
| 2001/0037749 A1* | 11/2001 | Ogawa | C09D 11/0235 106/31.26 |
| 2003/0144375 A1 | 7/2003 | Wu et al. | |
| 2004/0085419 A1 | 5/2004 | Yau et al. | |
| 2005/0182154 A1* | 8/2005 | Berge | C09D 11/30 523/160 |
| 2006/0100308 A1 | 5/2006 | Yau et al. | |
| 2006/0109327 A1 | 5/2006 | Diamond et al. | |
| 2007/0142572 A1 | 6/2007 | Ogawa et al. | |
| 2007/0289487 A1 | 12/2007 | Ham et al. | |
| 2008/0081124 A1 | 4/2008 | Sano et al. | |
| 2008/0207805 A1 | 8/2008 | Blease et al. | |
| 2008/0207811 A1 | 8/2008 | Brust et al. | |
| 2008/0226880 A1* | 9/2008 | Parra Pastor | C08G 18/12 428/195.1 |
| 2008/0254228 A1 | 10/2008 | Kojima et al. | |
| 2008/0317957 A1* | 12/2008 | Overbeek | C09D 11/101 427/256 |
| 2009/0169748 A1 | 7/2009 | House et al. | |
| 2009/0169749 A1 | 7/2009 | Brust et al. | |
| 2009/0182098 A1 | 7/2009 | Sano et al. | |
| 2009/0246484 A1 | 10/2009 | Kumagai et al. | |
| 2009/0306285 A1 | 12/2009 | Li et al. | |
| 2011/0032303 A1* | 2/2011 | Li | B41M 5/0017 347/20 |
| 2011/0239903 A1 | 10/2011 | Sujeeth et al. | |
| 2012/0001980 A1 | 1/2012 | Ichinose et al. | |
| 2012/0004348 A1 | 1/2012 | Reisacher et al. | |
| 2012/0021193 A1 | 1/2012 | Lecolley et al. | |
| 2012/0108717 A1 | 5/2012 | Park et al. | |
| 2012/0135209 A1 | 5/2012 | Becker et al. | |
| 2012/0223999 A1 | 9/2012 | Kraiter et al. | |
| 2012/0306976 A1 | 12/2012 | Kitagawa et al. | |
| 2012/0314009 A1* | 12/2012 | Kasahara | B41J 2/18 347/88 |
| 2012/0321863 A1 | 12/2012 | O'Donnell et al. | |
| 2012/0329921 A1 | 12/2012 | Vasudevan et al. | |
| 2013/0021406 A1 | 1/2013 | Stoeva et al. | |
| 2013/0162722 A1 | 6/2013 | Brust et al. | |
| 2013/0165618 A1 | 6/2013 | Brust et al. | |
| 2013/0201250 A1 | 8/2013 | Berge | |
| 2013/0221288 A1* | 8/2013 | Liu | H01B 1/02 252/514 |
| 2013/0224445 A1 | 8/2013 | Donohoe et al. | |
| 2013/0237661 A1 | 9/2013 | Brust et al. | |
| 2013/0265376 A1 | 10/2013 | Gil-Torrente et al. | |
| 2013/0286087 A1 | 10/2013 | Berge | |
| 2013/0307914 A1 | 11/2013 | Chen et al. | |
| 2014/0017461 A1 | 1/2014 | Matsuyama | |
| 2014/0022321 A1 | 1/2014 | Komatsu | |
| 2014/0037913 A1 | 2/2014 | Nagahama et al. | |
| 2014/0134337 A1 | 5/2014 | Overbeerk et al. | |
| 2014/0240399 A1 | 8/2014 | Saito et al. | |
| 2015/0038641 A1 | 2/2015 | Gobelt et al. | |
| 2015/0118452 A1 | 4/2015 | Ohashi et al. | |
| 2015/0119510 A1 | 4/2015 | Eliyahu et al. | |
| 2015/0191602 A1 | 7/2015 | Denda | |
| 2015/0210859 A1 | 7/2015 | Denda et al. | |
| 2015/0225285 A1 | 8/2015 | Domey et al. | |
| 2015/0315393 A1 | 11/2015 | Xu et al. | |

FOREIGN PATENT DOCUMENTS

| | | |
|---|---|---|
| EP | 2744834 | 12/2014 |
| EP | 2907670 | 8/2015 |
| EP | 3034312 | 6/2016 |
| JP | 2004-175918 | 6/2004 |
| JP | 2004-276569 | 10/2004 |
| JP | 2010 520324 | 6/2010 |
| WO | WO 2008/106148 A1 | 9/2008 |
| WO | WO 2009/025809 | 2/2009 |
| WO | WO 2013/026451 | 2/2013 |
| WO | WO 2016/111718 | 7/2016 |

OTHER PUBLICATIONS

International Searching Authority, International Preliminary Report on Patentability, dated Apr. 12, 2018, for International Application No. PCT/US2015/053544, Applicant R.R. Donnelley & Sons Company (13 pages).

International Searching Authority, International Search Report and Written Opinion, dated Feb. 5, 2016, for International Application No. PCT/US2015/053544, Applicant R.R. Donnelley & Sons Company (20 pages).

European Patent Office Examination Report, dated Jan. 10, 2018, Application No. 15734529.9, Applicant R.R. Donnelley & Sons Company (5 pages).

M.J. Forrest, Chemical Characterisation of Polyurethanes, 1999 (1 page).

Mitsui Chemicals, Product Data Sheet for Takelac WS 6021, Dec. 18, 2017 (5 pages).

Mitsui Chemicals, Product Data Sheet for Takelac WS 4000, Dec. 18, 2017 (5 pages).

Mitsui Chemicals, Product Data Sheet for Takelac WS 5000, Dec. 18, 2017 (5 pages).

International Searching Authority, International Search Report and Written Opinion dated Sep. 10, 2015, for International Application No. PCT/US2015/037750, Applicant, R.R. Donnelley & Sons Company (8 pages).

WIPO, Third Party Observation for International Application No. PCT/US2015/037750 dated Sep. 29, 2016, Applicant R.R. Donnelley & Sons Company (1 page).

EPO Communication dated Jul. 19, 2018, for Application No. 15 734 529.9-1102, Applicant R.R. Donnelley & Sons Company (3 pages).

Second Office Action including translation in related Chinese Application No. 201580034598.9 dated Jan. 8, 2020 (19 pages).

* cited by examiner

INK COMPOSITION INCLUDING POLYURETHANE

CROSS REFERENCE TO RELATED APPLICATIONS

The present application claims the benefit of U.S. Provisional Patent Application No. 62/017,804, filed Jun. 26, 2014, entitled "Ink Composition Including Polyurethane". The entire contents of all of these applications are incorporated herein by reference.

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to generally to ink compositions, and more particularly, to ink jet ink compositions used in a printing system that enables high-speed printing.

BACKGROUND

Ink jet printing technology provides printers with variable capability. There are three main ink jet technologies: thermal, i.e. bubble jet, piezoelectric, and continuous. In each, tiny droplets of ink are fired (i.e., sprayed) onto a page. In a thermal jet printer, a heat source vaporizes ink to create a bubble. The expanding bubble causes a droplet to form, and the droplet is ejected from the print head. Piezoelectric technology uses a piezo crystal located at the back of an ink reservoir. Alternating electric potentials are used to cause vibrations in the crystal. The back and forth motion of the crystal is able to draw in enough ink for one droplet and eject that ink onto the paper. In a continuous ink jet system, the nozzles are continuously firing and an electrode associated with each nozzle deflects the drops to a gutter for collection when the nozzle is not to print. When a nozzle is to print the electrode is deactivated and the drop will pass to the substrate.

The quality of high speed color ink jet printing is generally lower than that of offset lithography and gravure. Furthermore, the speed of the fastest ink jet printer is typically much slower than a lithographic or gravure press. Traditional aqueous-based ink jet printing is also plagued by the effect of placing a water-based ink on paper. Using a water-based ink may saturate the paper and may lead to wrinkling and distortion of the printed paper web, and the web may also be easily damaged by inadvertent exposure to moisture. In order to control these phenomena, ink jet printers use certain specialized papers or coatings. These papers can often be much more expensive than a traditional web paper used for commercial print.

Furthermore, when ink jet technology is used for color printing, ink coverage and water saturation may be increased. This is due to the four color process that is used to generate color images. Four color processing involves depositing cyan, magenta, yellow and black (i.e., CMYK) ink in varying amounts to make a specific process color on the page. Thus, some portions of the page may have as many as four layers of ink if all four colors are necessary to produce the desired process color. As a result of the total printed drop volume of the various inks needed to print the desired process color, the dots printed by an ink jet printer may spread and produce a fuzzy image. Control of the drop spread or growth is achieved by careful balance of the formulation components to optimize the drop spread or growth to give the desired printed drop overlap without fuzziness or intercolor ink mixing. Still further, inks used in ink jet printers tend to be more expensive as compared to inks used in traditional lithography or gravure printing. However, careful control of dot drop growth and ink interaction with the paper substrate through precise formulation control can lower the overall cost associated with using inkjet type inks which allow for the use of the highly advantageous variable nature of the inkjet printing technology without sacrifice in final print quality.

In some cases, it is therefore appropriate to use high speed ink jet printing rather than lithography or gravure. Under such circumstances, it is desirable for the images on the web to have long term durability. Long term durability refers to the ability of the ink to remain on the final printed product and resist potential damage caused by post-printing water exposure, highlighting markers, and other mechanical abrasions to the printed document. Additionally, paper types are grouped into both uncoated and coated papers that have varying degrees of porosity to water-based inkjet inks, with the coated papers exhibiting lower porosity levels and slower absorption rates of the water-based inkjet inks. The result is that long term durability of inkjet images on coated papers tend to be of a reduced quality in comparison to uncoated inkjet printed papers in terms of the properties listed previously.

One final challenge is the characteristic of short term durability that is important in the immediate printed paper movement or transport through the printing system. Paper folding and forming operations through the printing system can damage the freshly printed inkjet image due to shear forces and contact with various print system hardware. For example during the printing process there is a tendency for the ink to be disturbed by shear stresses as the web moves through subsequent cylinders and/or other elements of the high speed printing press. Formulation designs that allow for quick ink setting on the paper sheet and immediate resistance to smearing or offsetting in the printing system will be advantageous.

SUMMARY

According to one aspect, an ink composition includes a colorant, a polyurethane having a peak average molecular weight range of from about 10,000 g/mol to about 40,000 g/mol, and a solvent. The ink composition has a total solids content of less than about 15% by solids, and a ratio of colorant to polyurethane between about 2:1 and 1:2 by weight.

According to another aspect, an ink composition adapted to be applied using an ink jet print head includes from about 2.0% to about 7.5% solids of a colorant, from about 1.0% to about 9.3% solids of a polyurethane having a peak average molecular weight range of from about 10,000 g/mol to about 40,000 g/mol, and a solvent.

According to yet another aspect, a method of printing using an ink jet print head comprising the step of jetting an ink composition onto a substrate, wherein the ink composition comprises a polyurethane having a peak average molecular weight range of from about 10,000 g/mol to about 40,000 g/mol.

According to a further another aspect, a device for use in an ink jet print operation includes a housing, a series of ejection nozzles mounted within the housing, and an ink within the housing communicating with the nozzles. The ink comprises a polyurethane having a peak average molecular weight range of from about 25,000 g/mol to about 35,000 g/mol.

Other aspects and advantages will become apparent upon consideration of the following detailed description and the attached drawings wherein like numerals designate like structures throughout the specification.

DETAILED DESCRIPTION

An ink composition of the present application includes a colorant, a polyurethane having a peak average molecular weight range of from about 10,000 g/mol to about 40,000 g/mol, and a solvent. The ink composition has a total solids content of less than about 15% by weight, and a ratio of colorant to polyurethane between about 2:1 and 1:2 by weight.

Such ink composition is suitable for use in a high-speed printing system. A print medium, such as a web, paper, or other substrate, moves through the web at a speed greater than about 50 ft/min, preferably greater than about 300 ft/min, and most preferably between about 500 and about 1,000 ft/min.

The ink composition has a viscosity such that the ink composition can be applied to a substrate using an ink jet print head. The viscosity may range from about 1.0 to 20.0 centipoise (cP), preferably from about 4.0 cP to about 6.0 cP, although the preferred viscosity may depend in part on the requirements of the ink jet print head to be used.

The polyurethane acts as a binder to stabilize the colorant on the print medium. It is well known that high molecular weights provide increased long term durability of a final product. It was surprisingly found that a polyurethane with a relatively low molecular weight was jettable and provided immediate durability, while also providing an acceptable level of long term durability. Immediate durability refers to the ability of the jetted ink composition to bond to the paper web quickly and move through a high speed printing press without transferring to elements of the press and/or depositing on the ink nozzle of an ink cartridge. The peak average and weight average molecular weights were determined using a standard gel permeation chromatography (GPC). The polyurethane of the present application has a peak average molecular weight (Mp) of from about 10,000 g/mol to about 40,000 g/mol, preferably about 30,000 g/mol.

The acid number is the mass of potassium hydroxide (KOH) in milligrams that is required to neutralize one gram of a substance or composition. The acid number of a composition may be determined using appropriate international standards such as ASTM D664. To determine the acid number of a composition, a known amount of sample dissolved in organic solvent is titrated with a solution of potassium hydroxide with known concentration and with phenolphthalein as a color indicator. The acid number of the polyurethane of the ink composition of the present application ranges between about 15 and about 25.

Suitable polyurethanes for the ink composition of the present application include R4289 and R2650 polyurethanes by Essential Industries (Racine, Wis.), although other polyurethanes may be used.

The colorant may be any conventional pigment or dye commercially available. Examples of suitable colorants include but, are not limited to, carbon black colorant such as IJX 1996 by Cabot Corp. (Boston, Mass.), magenta colorant such as Cab-O-Jet 465 by Cabot Corp. (Boston, Mass.), cyan colorant such as Cab-O-Jet 450 or 452 by Cabot Corp. (Boston, Mass.), or yellow colorant such as Cab-O-Jet 470 by Cabot Corp. (Boston, Mass.).

The total solids content of the ink composition is less than about 15% by weight. The ink composition may include about 2.0% to about 7.5% solids of a colorant and about 1.0% to about 9.3% solids of a polyurethane. The ratio of colorant to polyurethane may range from about 2:1 to about 1:2.

The ink composition of the present application may include water as a solvent. The composition may also include a water-soluble organic compound as a co-solvent. Suitable water-soluble or miscible organic components include: glycerin; polyglycerols, alcohols, such as methyl alcohol, ethyl alcohol, n-propyl alcohol, isopropyl alcohol, n-butyl alcohol, sec-butyl alcohol, or tert-butyl alcohol; amides, such as dimethylformamide or dimethylacetamide; carboxylic acids; esters, such as ethyl acetate, methyl lactate, ethyl lactate, propyl lactate and ethylene carbonate; ethers, such as 2-butoxyethanol, tetrahydrofuran or dioxane; glycols, such as propylene glycol, and diethylene glycol; glycol esters; glycol ethers, such as propylene glycol methyl ether, dipropylene glycol methyl ether; ketones, such as acetone, diacetone, or methyl ethyl ketone; lactams, such as N-isopropyl caprolactam or N-ethyl valerolactam, 2-pyrrolidinone, N-methylpyrrolidinone; lactones, such as butyrolactone; organosulfides; sulfones, such as dimethylsulfone; organosulfoxides, such as dimethyl sulfoxide or tetramethylene sulfoxide; and derivatives thereof and mixtures thereof. The additional materials may add other properties to the composition including acting as a humectant to prevent the ink from drying out in the print heads.

The relative amount of water verses other materials can be widely varied depending on the desired properties of the finished ink. In general, inks with more water relative to the other materials, particularly humectants, will dry faster as the water is easier to flash off in the driers than the other components.

In other embodiments, the ink composition may contain a surfactant or surface active agent present in an amount of up to about 2.5% by weight. The surfactant or surface modifying agent may include, for example, nonionic surfactants, such as poloxamer, ethoxylated acetylenediol or other ethoxylated surfactants. Any type of surfactant may be useful to include in the ink composition to impart the desired properties including anionic, nonionic, cationic, or other types of surfactants. In addition, leveling agents also can act as surface modifying agents.

The ethoxylated acetylenediol suitable for use include Air Products' Surfynol® 400 series surfactants: Surfynol® 420, 440, 465, and 485, respectively. The Surfynol® 400 series surfactants by Air Products (Allentown, Pa.) are produced by reacting various amounts of ethylene oxide with 2,4,7,9-tetra-methyl-5-decyne-4,7-diol (Air Products' Surfynol® 104), a nonionic molecule with a hydrophilic section in the middle of two symmetric hydrophobic groups.

In further embodiments, the ink composition can include further viscosity modifying compounds. These compounds can be used to further control the viscosity of the ink composition so that the ink dispenses properly from the chosen ink jet head. Suitable viscosity modifiers include acrylic acid copolymers, hydrophobically modified acrylic acid copolymers and the like. Suitable viscosity modifiers include Rheolate 125 available from Elementis Specialties, Inc., East Windsor, N.J., USA.

The ink composition may also include optional components such as a preservative such as Proxel GXL by Arch Biocides (Smyrna, Ga.), an anticurl agent, a biocide, a defoaming agent, a leveling agent, a salt, an inorganic compound, an organic compound, a pH modifier, and/or any combination thereof.

The following examples further illustrate the disclosure but, of course, should not be construed as in any way limiting its scope.

Example 1. An ink composition useful in the present disclosure was prepared as follows:
- 30% by volume (4.50% solids) magenta colorant (COJ 465)
- 18% by volume (5.67% solids) polyurethane (R4289)
- 0.1% by volume Proxel GXL
- 0.15% by volume ethoxylated acetylenediol (Surfynol 440)
- 1% by volume ethoxylated acetylenediol (Surfynol 465)
- 5% by volume tetraethylene glycol
- 30% by volume glycerin
- 1% by volume triethanolamine/acetate salt
- 14.75% by volume deionized water Example 2. A second ink composition useful in the present disclosure was prepared as follows:
- 30% by volume (4.50% solids) yellow colorant (COJ 470)
- 15% by volume (4.73% solids) polyurethane (R4289)
- 0.1% by volume Proxel GXL
- 0.1% by volume ethoxylated acetylenediol (Surfynol 440)
- 1% by volume ethoxylated acetylenediol (Surfynol 465)
- 5% by volume tetraethylene glycol
- 32% by volume glycerin
- 1% by volume triethanolamine/acetate salt
- 15.8% by volume deionized water Example 3. A third ink composition useful in the present disclosure was prepared as follows:
- 15% by volume (2.25% solids) cyan colorant (COJ 452)
- 15% by volume (4.73% solids) polyurethane (R4289)
- 0.1% by volume Proxel GXL
- 0.1% by volume ethoxylated acetylenediol (Surfynol 440)
- 1% by volume ethoxylated acetylenediol (Surfynol 465)
- 4% by volume tetraethylene glycol
- 37% by volume glycerin
- 1% by volume triethanolamine/acetate salt
- 26.8% by volume deionized water Example 4. A fourth ink composition useful in the present invention was prepared as follows:
- 30% by volume (4.50% solids) carbon black (IJX 1996)
- 15% by volume (4.73% solids) polyurethane (R2650)
- 0.1% by volume Proxel GXL
- 0.07% by volume ethoxylated acetylenediol (Surfynol 440)
- 0.85% by volume ethoxylated acetylenediol (Surfynol 465)
- 5% by volume tetraethylene glycol
- 29% by volume glycerin
- 1% by volume triethanolamine/acetate salt
- 18.98% by volume deionized water All of the formulations of Examples 1-4 produced valuable printing inks with acceptable immediate and long term durability.

Example 5. A further ink composition useful in the present disclosure was prepared as follows:
- 30% by volume (4.50% solids) carbon black (IJX 1996)
- 15% by volume (4.73% solids) polyurethane (R2650)
- 0.1% by volume Proxel GXL
- 0.55% by volume ethoxylated acetylenediol (Surfynol 440)
- 0.1% by volume ethoxylated acetylenediol (Surfynol 465)
- 5% by volume diglycerol (60% solids)
- 0.5% by volume modified acrylic acid copolymer (Rheolate 125)
- 22.5% by volume glycerin
- 1% by volume triethanolamine/acetate salt
- 1% by volume dimethylethanolamine (10% solids)
- 21.4% by volume deionized water The viscosity of the ink of Example 5 is 5.48 cP at 32° C., the surface tension is 35.8 dynes/cm at 25° C., and the pH is 9.24.

The formulation of Example 5 produced valuable printing ink with acceptable immediate and long term durability.

Evaluation of ink adhesion to the paper substrate and cohesion of the ink to itself was determined through the use of a rub test apparatus that applies a shearing abrasive weighted force to the surface of the ink in a direction parallel to the surface of the ink/paper combination. One example of such rub test apparatus known in the art is a Crockmeter (Taber Industries, North Tonawanda, N.Y.). Printed ink samples at coverages of 100 to 400% TAC (total area coverage) were provided for the analysis by printing the respective individual (i.e., cyan, magenta, yellow, black) and color combinations of each of the listed colors in combinations up to and including 400% of ink applied to the surface. Inks were dried in sequence using an infrared drying system that is typical for high speed inkjet printing systems. Sample coupons were cut from the dried ink/paper combination within 30 seconds of printing and subjected to the rub test stress at a preset number of rubbing cycles and force correlated to equivalent forces typical of those on high speed inkjet paper handling equipment. The abrasive surface was typically a section of a rubberized transfer belt that is commonly used in the paper transfer sections of a high speed inkjet press paper handling system. Evaluation of ink adhesion and cohesion was determined through the use of reflection densitometer measurements of the actual printed ink areas and the areas immediately adjacent to the printed area. Deviations from sample measurements taken from samples not subjected to the rub test apparatus protocol were used to rank durability improvements of the inkjet ink formulations.

INDUSTRIAL APPLICABILITY

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure. Numerous modifications to the present disclosure will be apparent to those skilled in the art in view of the foregoing description. It should be understood that the illustrated embodiments are exemplary only, and should not be taken as limiting the scope of the disclosure.

We claim:

1. An ink composition comprising: a colorant, a polyurethane having a peak molecular weight range of from about 25,000 g/mol to about 35,000 g/mol, and a solvent, wherein the ink composition has a total solids content of less than about 15% by weight, and has a ratio of colorant to polyurethane between about 2:1 and 1:2 by weight, and wherein the ink composition has a viscosity between about 1 and about 20 cP, and wherein the polyurethane is present in an amount from about 2.9% to about 5.67% solids.

2. The ink composition of claim 1 wherein the colorant is present in an amount from about 2.0% to about 7.5% solids.

3. The ink composition of claim 1 wherein the solvent is water.

4. The ink composition of claim 3 wherein the solvent additionally includes a humectant.

5. The ink composition of claim 1 wherein the composition also includes at least one surface active agent.

6. The ink composition of claim 1 wherein the composition also includes a viscosity modifying agent.

7. The ink composition of claim 1 wherein the composition has a viscosity of from about 4.0 to about 6.0 cP.

8. The ink composition of claim 1 wherein the polyurethane has an acid number of between about 15 to about 25.

9. A method of printing using an ink jet print head comprising the step of jetting an ink composition onto a substrate, wherein the ink composition comprises a colorant, a polyurethane having a peak molecular weight range of from about 25,000 g/mol to about 35,000 g/mol, and a solvent, wherein the ink composition has a total solids content of less than about 15% by weight, and has a ratio of colorant to polyurethane between about 2:1 and 1:2 by weight, and wherein the ink composition has a viscosity between about 1 and about 20 cP, and wherein the polyurethane is present in an amount from about 2.9% to about 5.67% solids.

10. The method of claim 9 wherein the colorant is present in an amount from about 2.9% to about 7.5% solids.

11. The method of claim 9 wherein the solvent is water.

12. The method of claim 11 wherein the solvent additionally includes a humectant.

13. The method of claim 9 wherein the composition also includes at least one surface active agent.

14. The method of claim 9 wherein the composition also includes a viscosity modifying agent.

15. The method of claim 9 wherein the composition has a viscosity of from about 4.0 to about 6.0 cP.

16. The method of claim 9 wherein the polyurethane has an acid number of between about 15 to about 25.

* * * * *